INVENTORS
Raymond McKibbin
BY Normand Bergeron

Albert Gordon ATT'Y

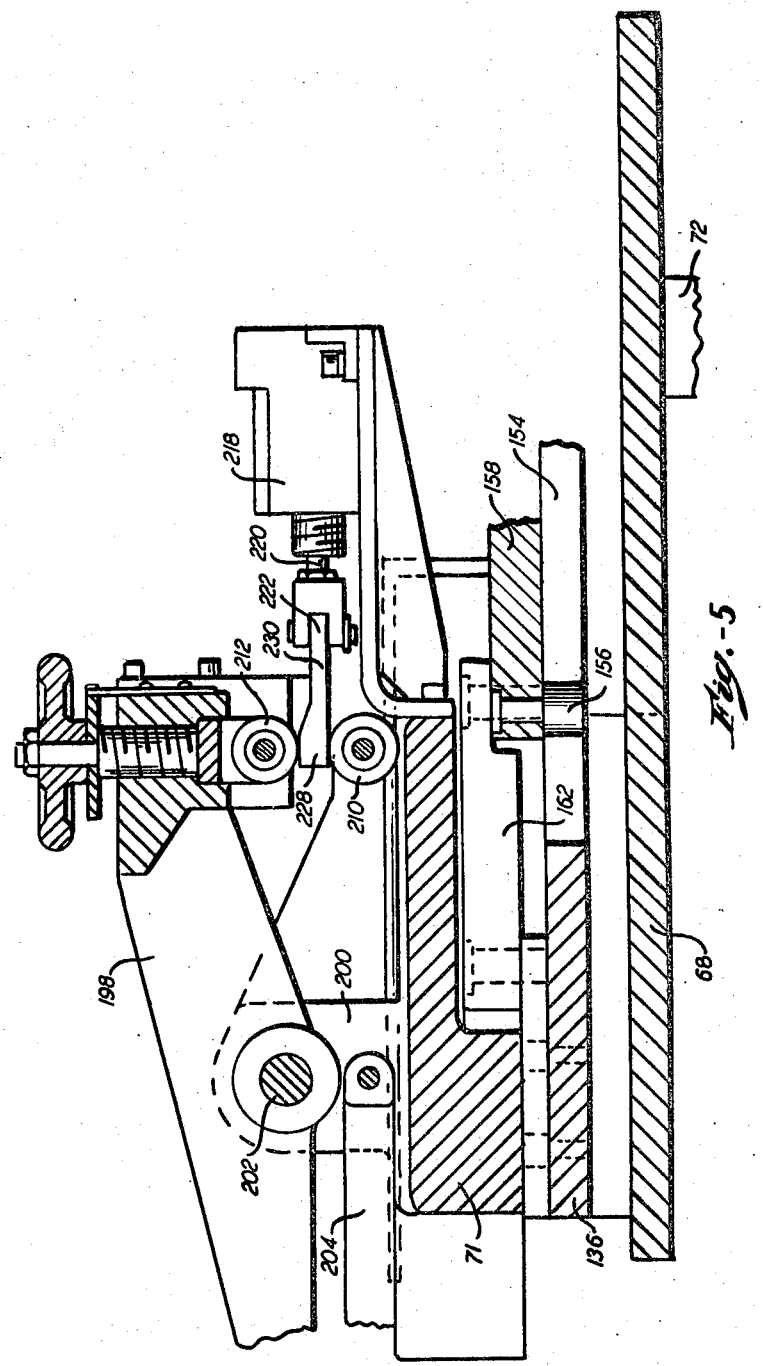

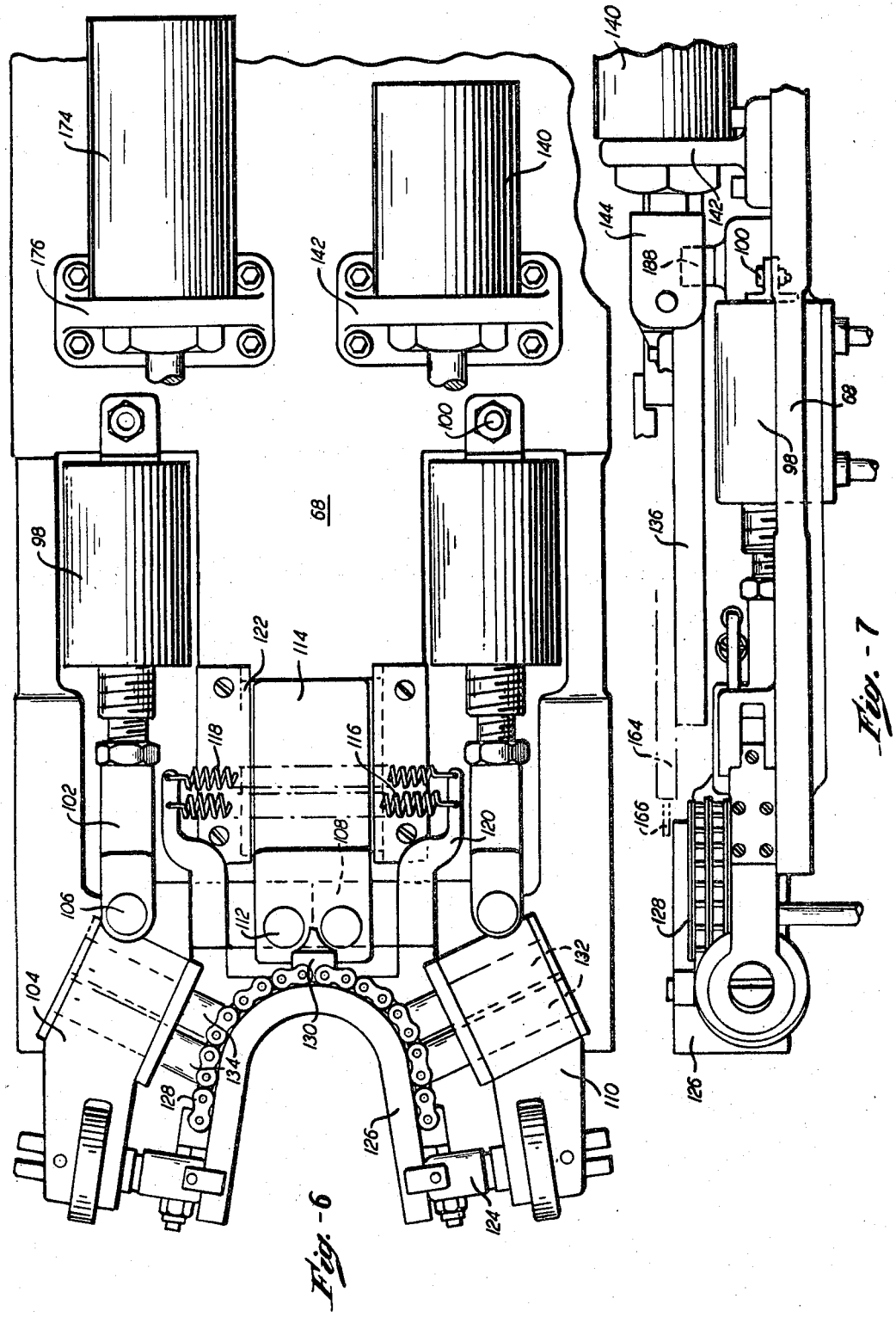

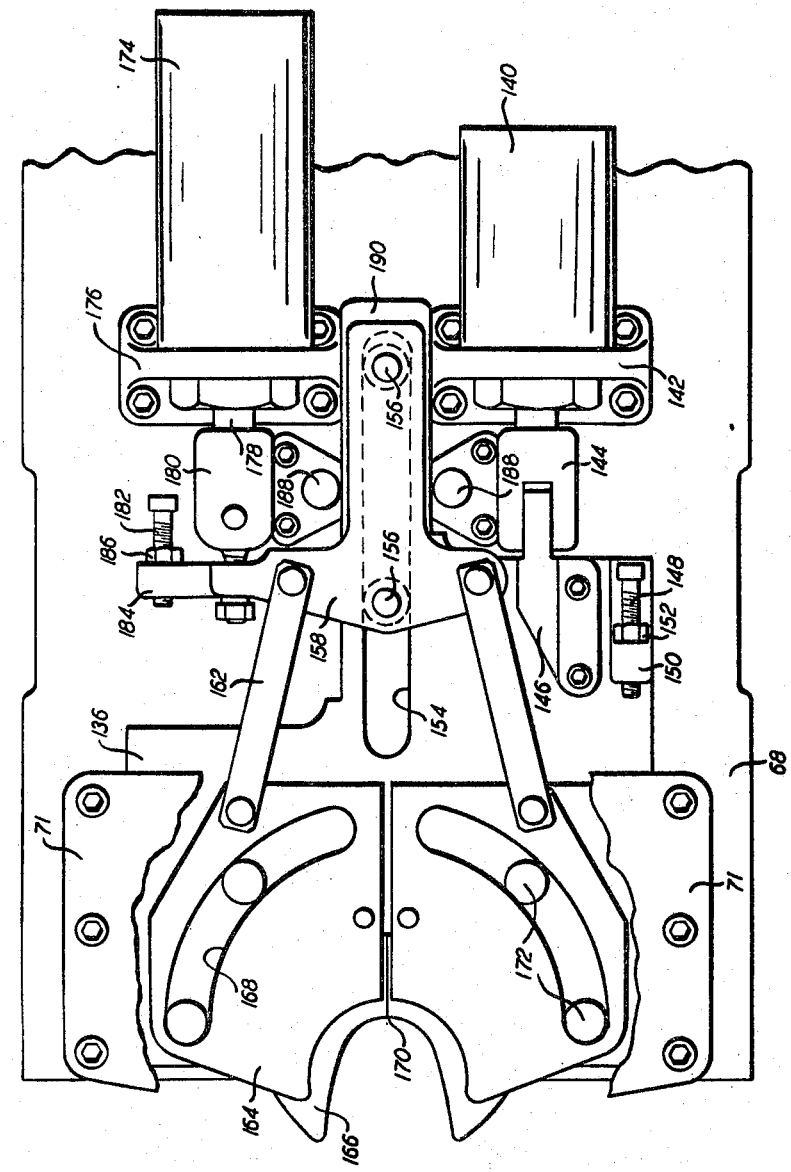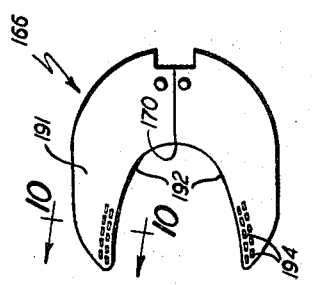

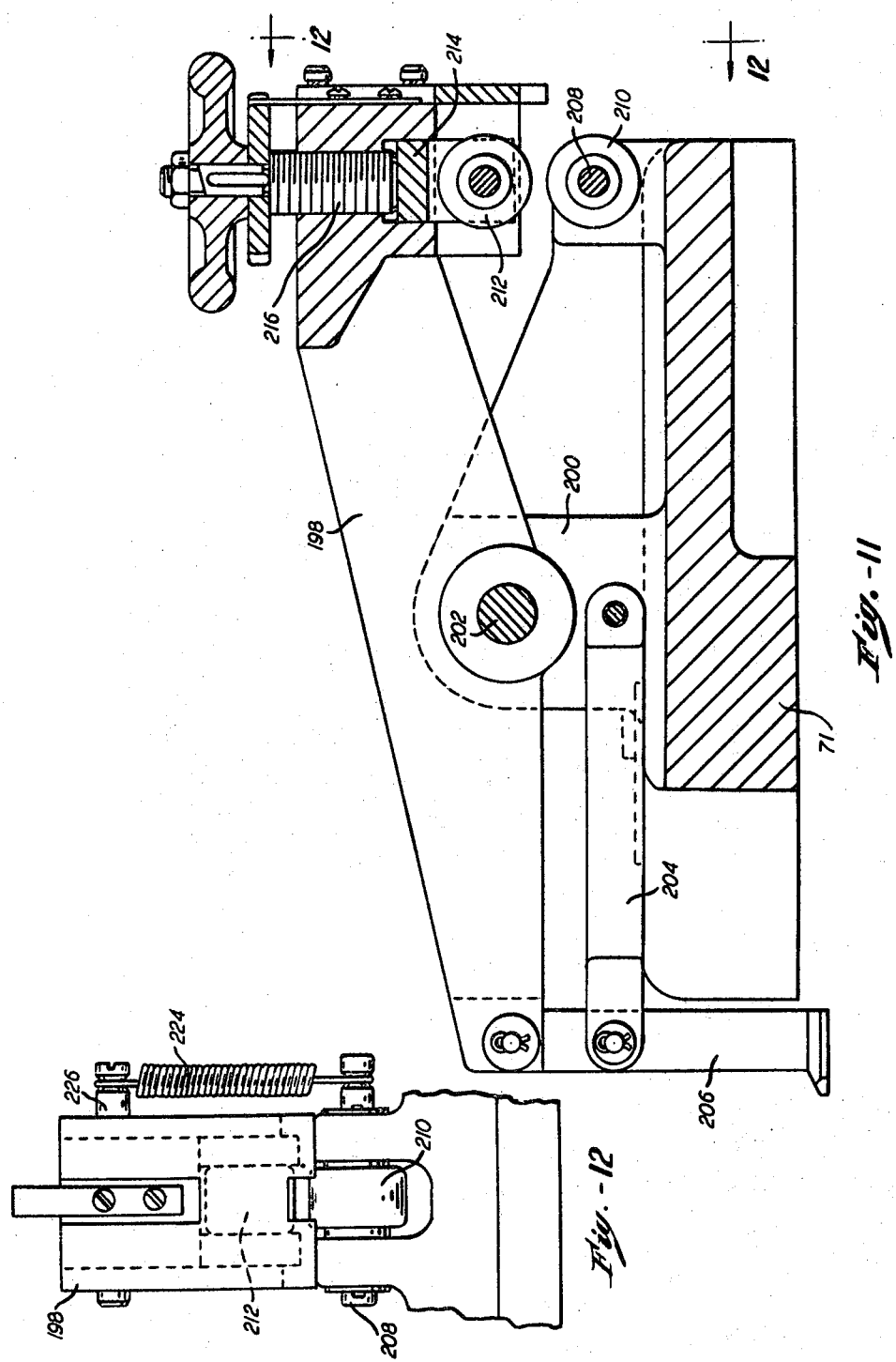

United States Patent Office 3,386,115
Patented June 4, 1968

3,386,115
SHOE END LASTING WITH PRONGED WIPERS
Raymond McKibbin and Normand Bergeron, Montreal, Quebec, Canada, assignors to Jacob S. Kamborian, West Newton, Mass.
Filed July 11, 1963, Ser. No. 294,351
14 Claims. (Cl. 12—12.5)

This invention relates to the lasting of an end of a shoe.

In the wiping of the margin of a shoe upper mounted on a last upon a shoe insole located on the last bottom at the heel or toe of the shoe, it is conventional practice to utilize shoe end embracing wipers that are mounted for both forward and inward closing movement to engage the margin and wipe it against the insloe. It has been found desirable to also force the margin portions located forwardly of the end extremity of the shoe inwardly of the shoe in a direction substantially normal to the longitudinal center line of the shoe to thereby stretch the upper tightly about the last in these areas and thus prevent the margin of the upper from fading away from the wipers and provide a tight stretching of the upper about the last. To accomplish these results, forepart pincers are utilized in conjunction with a toe lasting operation in application Ser. No. 100,979, filed Apr. 5, 1961 and breast line pincers are utilized in conjunction with a heel seat lasting operation in application Ser. No. 125,691, filed July 21, 1961.

Applicants have discovered that these results may be attained by placing prongs in otherwise smooth surfaces of the wipers in regions of the wipers that engage the upper forwardly of the end extremity of the upper and by causing the pronged portions of the wipers to move across the bottom of the last in a direction that is substantially normal to the longitudinal center line of the last.

With the above objectives in mind, the illustrative embodiment of the invention discloses a heel seat lasting machine patterned on the machine disclosed in application Ser. No. 107,156, filed May 2, 1961. This machine includes a shoe support for supporting a last having a shoe upper mounted thereon and a shoe insole located on its bottom. Heel end embracing wipers are provided that are driven forwardly and inwardly to wipe the heel portion of the upper against the insole. This machine has been modified, as disclosed in the instant specification, to provide prongs on the forward portions of the wipers and to provide a drive for the wipers that causes the wipers to first be translated forwardly and then to be swung inwardly. During the forward translation of the wipers, the upper margin at the heel end extremity is wiped against the insole without the pronged portions of the wipers engaging the upper, and during the inward movement of the wipers the prongs engage the upper margin portions at about the breastlines to stretch them inwardly of the last.

The wiper driving mechanism developed by us has utility apart from operating the pronged wipers discussed above. This mechanism includes a plate slidably mounted in the machine frame for translatory movement. The wipers are mounted on the plate for inward movement. A first drive mechanism is connected to the plate to effect translation thereof and thereby effect translation of the wipers, and a second drive mechanism operable independently of the first drive mechanism is connected to the wipers to effect their inward movement.

In the accompanying drawings:

FIGURE 5 is a detail, partly in section, of the heel seat lasting unit and of a hold-down unit;

FIGURE 6 is a plan view of a heel clamping means in the machine;

FIGURE 7 is a side elevation of the heel clamping means;

FIGURE 8 is a plan view of the wiper driving mechanism;

FIGURE 9 is a bottom view of the wipers;

FIGURE 10 is a section taken on the line 10—10 of FIG. 9;

FIGURE 11 is a side elevation of the hold-down unit;

FIGURE 12 is a view taken on the line 12—12 of FIGURE 11;

Figure 1:
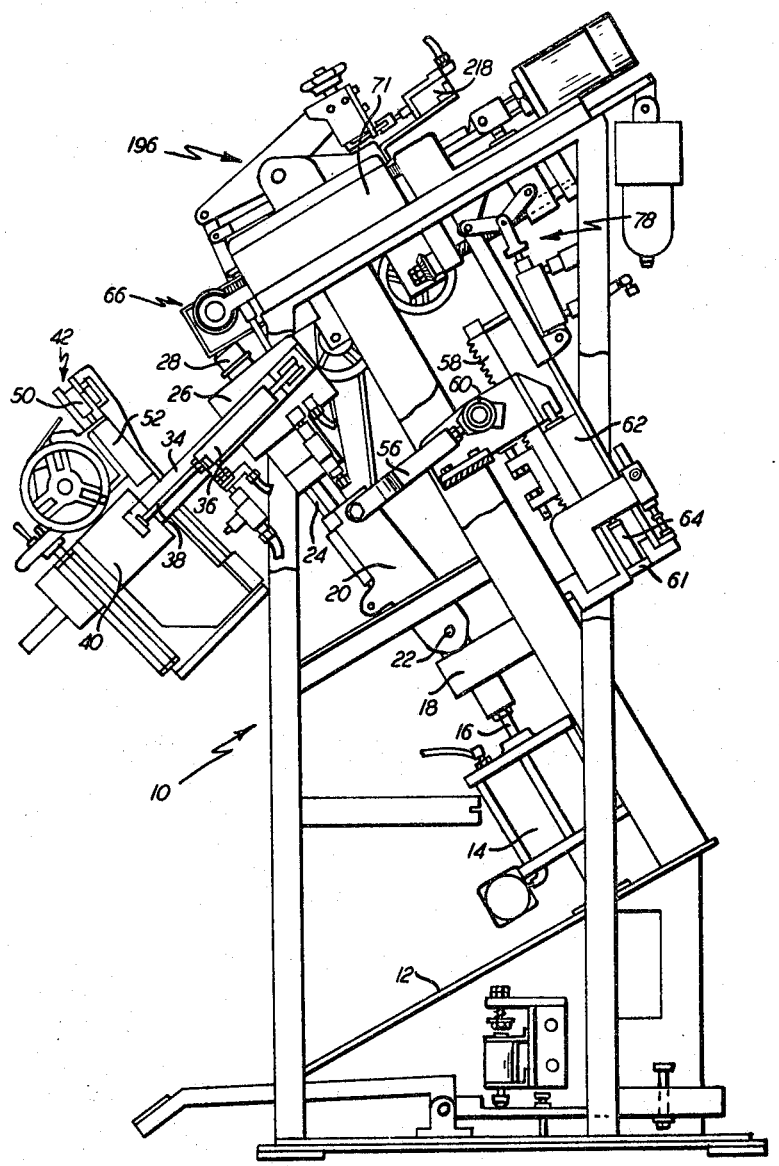
FIG. 1 is a side elevation view of the machine.
Figure 2:
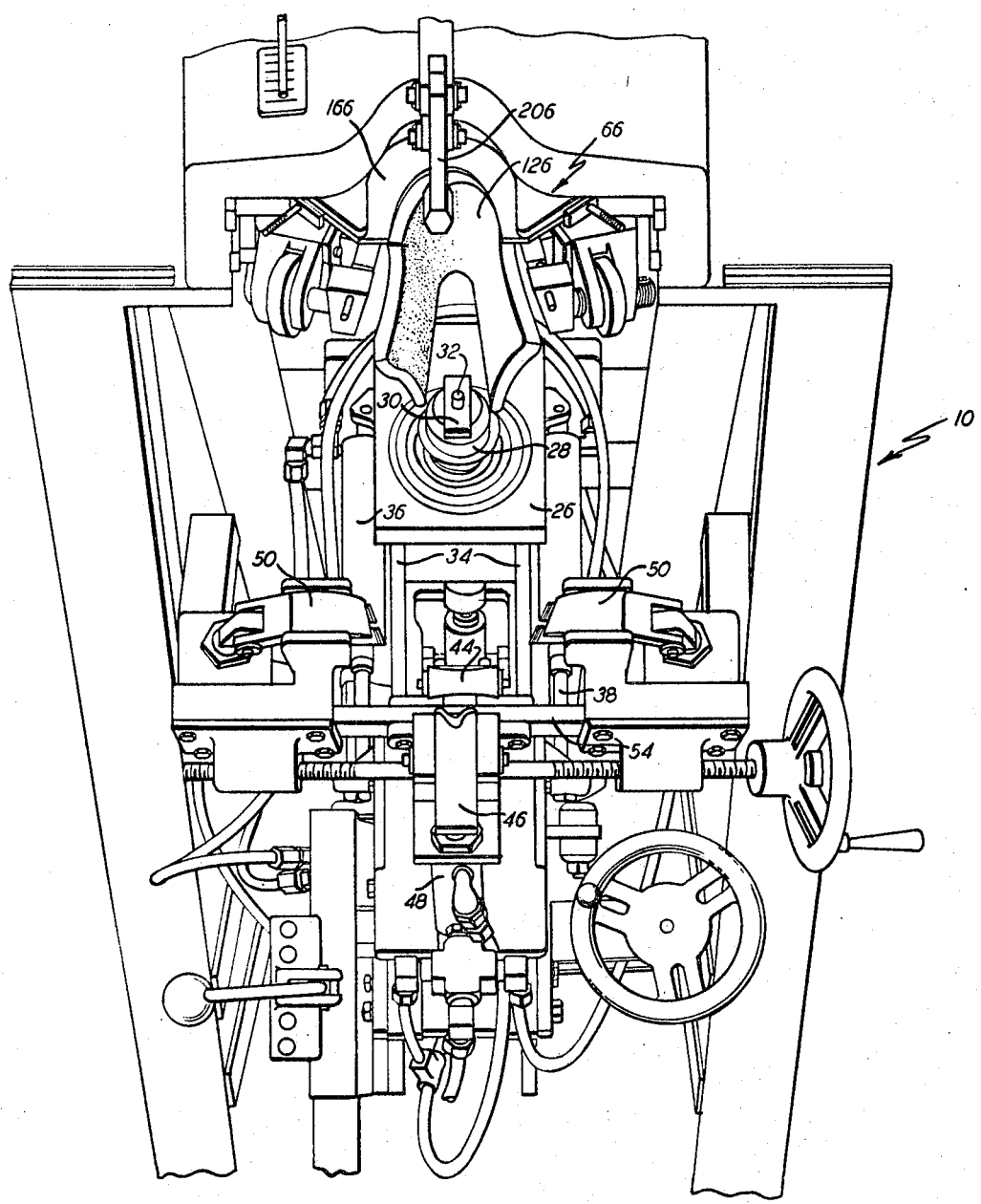
FIG. 2 is a front elevation view of the machine.

Referring to FIGS. 1 and 2, the machine comprises a frame 10 having an inclined plate 12. An air actuated motor 14, mounted on the plate 12, has a piston rod 16 extending upwardly therefrom that is guided in a guide bearing 18 secured to the frame. A post 20 is pivotally secured to the piston rod 16 by a pivot 22. A rod 24, received in the upper end of the post 20, has a swivel block 26 pivotally mounted thereon for swinging movement about the axis of the rod. A last pin holder 28, mounted at the upper end of the rod 24, receives a last supporting plate 30 and a last pin 32 projecting upwardly through a hole in the plate 30. A pair of parallel bars 34 are connected to and extend forwardly of the swivel block 26. An air operated motor 36 is pivotally connected to each bar 34 to extend forwardly of the block 26. The piston rods 38 of the motors 36 are rigidly connected to a head 40 forming part of an upper tensioning unit 42 that is slidably mounted on the bars 34.

The unit 42 includes a toe rest roller 44, a front pincers 46 that is actuable by an air operated motor 48, and two side pincers 50 each of which is actuatable by an air operated motor 52. The pincers 46 and 50 are mounted on a T-bar 54, and an air operated motor (not shown) is provided in the unit 42 to raise and lower the pincers in unison.

The post 20 is pivotally connected to a pitman 56 and the pitman is operatively connected to a rack 58 by way of a connection that includes a crank 60 whereby heightwise movement of the rack effects swinging movement of the post 20 about the pivot 22. The rack 58 is mounted in a rack frame 61. An air operated motor 62, mounted on the machine frame 10, has a piston rod 64 connected to the rack frame 61 to effect the heightwise movement of the rack.

Figure 3:
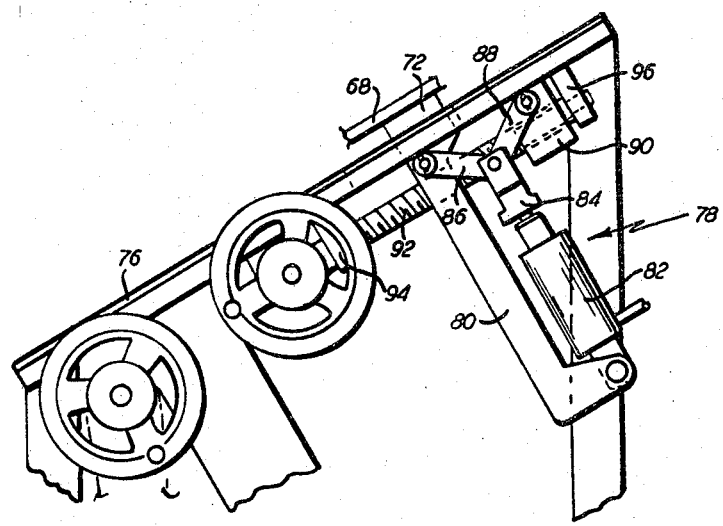
FIG. 3 is a detail showing a mechanism for moving a heel seat lasting unit, of which the wipers form a part, from an out-oft-the-way position to a working position.
Figure 4:
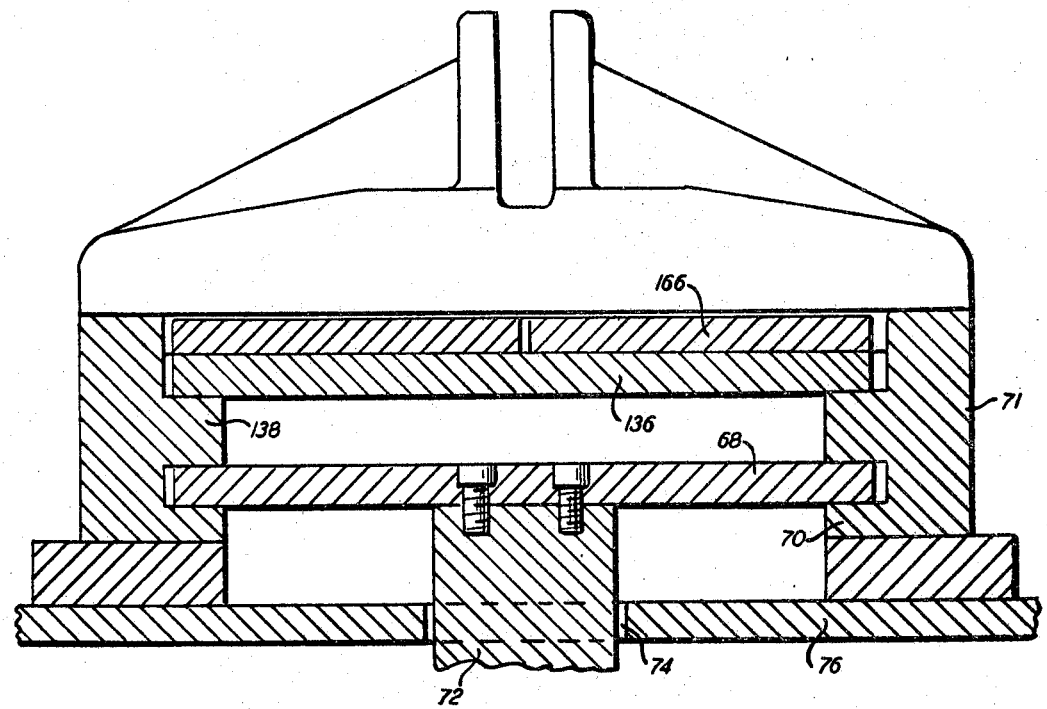
FIGURE 4 is a vertical section through the heel seat lasting unit.

A heel seat lasting unit 66 is mounted in the frame 10 rearwardly of the upper tensioning unit 42. Referring to FIGS. 3 and 4, the unit 66 comprises a main slide plate 68 slidably mounted for forward and rearward movement on gibs 70 in a frame cover 71 forming a part of the frame 10. A block 72 is secured to the plate 68 and is slidable in a slot 74 formed in a table 76, which table forms a part of the frame 10. A floating actuator 78 is secured to the blocks 72. The actuator 78 comprises a bar 80 depending from and rigid with the block 72. An air operated motor 82 is pivoted to the bar 80 and has a piston rod 84 extending upwardly therefrom. A pair of toggle links 86 and 88 are pivoted at their adjoining ends to the piston rod 84 and are respectively pivoted at their opposite ends to the bar 80 and a nut 90. The nut 90 is threaded onto a screw 92 that is rotatably mounted in hangers 94 and 96 depending from the table 76. Thus actuation of the motor 82 to open or close the toggle linkage formed by the members 84, 86 and 88 will cause the main slide plate 68 and the members carried thereby to move forwardly and rearwardly in the frame.

Referring to FIGS. 6 and 7, a pair of air actuated motors 98 are pivotally mounted on the plate 68 by pivots 100. Each motor 98 has a piston rod 102 that is pivotally connected to a lever 104 by a pivot 106. The levers 104 have legs 108 extending toward each other from the pivots 106 and legs 110 extending forwardly and divergently from the pivots 106. The legs 108 are pivotally connected by pivots 112 to a slide 114. A pair of tension springs 116 and 118 are connected at their opposite ends to arms 120 that are fixed to the legs 108. The springs force the levers 104 about the pivots 112 to the position shown in FIG. 6 where the contiguous faces of the legs 108 abut each other. The slide 114 is slidably mounted in gibs 122 mounted on the plate 68. The lever legs 110 have studs 124 adjustably mounted in their extremities, and the studs 124 are affixed to the ends of a U-shaped heel clamping pad 126 made of a flexible material such as leather. A pair of sprocket chains 128 are wrapped about the outer periphery of the pad 126. Each chain 128 is anchored at one end to a stud 124 and is connected at its other end to a projection 130 at the forward end of the slide 114. A pair of spring return air actuated motors 132 are mounted in each of the lever legs 110. The motors 132 have pistons extending toward the pad 126 to which presser members 134 are affixed.

Referring to FIGS. 4, 5, and 8, a wiper supporting slide plate 136 is slidably mounted for forward and rearward movement in the frame cover 71 on gibs 138 above the main slide plate 68. An air operated motor 140 is secured to a rib 142 on the main slide plate 68. The piston rod 144 of the motor 140 is connected to the plate 136 by way of a link 146. A bolt 148 is adjustably threaded in a lug 150 fixed to the plate 136 by means of a lock nut 152 and is in alignment with the frame cover 71. The plate 136 has a slot 154 extending along its center line that receives a pair of rollers 156 extending downwardly from a drive rod 158. Links 162 are pivoted to the forward end of the rod 158. The opposite ends of the links 162 are pivoted to wiper cams 164 and a wiper 166 is mounted in each wiper cam. The wiper cams 164 have curved cam slots 168 with a center of curvature at their bight where the wipers diverge from each other, indicated by numeral 170 in FIGURE 8 and hereinafter referred to as the vertex of the wipers. The wiper cams 164 rest on the plate 136, and the plate 136 has rollers 172 extending upwardly therefrom into the cam slots 168. An air actuated motor 174, secured to a rib 176 on the main slide plate 68, has a piston rod 178 that is connected to the rod 158 by a coupling 180. A bolt 182, adjustably threaded into an extension 184 of the rod 158 by a lock nut 186, is in alignment with the frame cover 71. A pair of rollers 188, extending upwardly from the main slide plate 68, engage the sides of a relatively narrow neck 190 formed at the rear of the plate 136.

The wipers 166 are substantially flat plates having smooth coplanar under surfaces 191 and side surfaces 192 that diverge forwardly from the vertex 170. As shown in FIGURES 9 and 10, the wiper under surfaces 191 adjacent the side surfaces 192 in the region furthermost from the vertex 170 have a plurality of downwardly extending sharp prongs 194. In the illustrative embodiment of the invention, the prongs are struck out from the surface 191 by upsetting them with a cold chisel.

A hold-down unit 196 is mounted on the frame cover 71. The unit 196 comprises a lever 198 pivoted to a clevis 200 on the cover 71 by a pivot 202, see FIGS. 5 and 11. A link 204 is pivoted to the cover 71 below the pivot 202, and both the lever 198 and link 204 are pivotally connected to a hold-down foot 206. The lever 198, link 204 and foot 206 thus form a parallel linkage mechanism whereby counterclockwise movement of the lever (FIG. 11) imparts a substantially rectilinear downward movement to the foot and clockwise movement of the lever imparts a substantially rectilinear upward movement to he foot. A pin 208 is rotatably mounted in the cover 71 rearwardly of the pivot 202, and a roller 210 is affixed to the pin 208. A roller 212 is rotatably mounted in a clevis 214 that is slidably mounted for up and down movement at the rear end of the lever 198 opposite the roller 210. A screw 216 bears against the upper surface of the clevis 214 to limit the upward movement of the clevis in the lever 198. An air operated motor 218 is secured to the cover 71. The piston rod 220 of the motor 218 has a cam 222 secured thereto that is interposed between the rollers 210 and 212. A tension spring 224 (FIG. 12) extending from the pin 208 to a pin 226 fixed to the lever 198 urges the roller 212 against the cam 222. The cam 222 has a high portion 228 that is normally interposed between the rollers 210 and 212. The actuation of the motor 218 to bring a low portion 230 of the cam between the rollers will cause the spring 224 to move the roller 212 downwardly against the cam portion 230, swing the lever 198 clockwise, and thereby raise the hold-down foot 206, for a purpose that is explained below.

In the preferred mode of operation of the machine, it is used to carry out the method disclosed in application Ser. No. 80,919, filed Jan. 5, 1961. In this method a thermoplastic counter coated on both of its surfaces with a thermoplastic adhesive is inserted in a pocket formed between an upper and a liner at the heel end of the upper. The counter-upper assembly is heated to render the counter flaccid and moldable and the adhesive tacky and adherent and the assembly is draped about the last, tensioning forces are applied at the toe end of the upper to wrap the upper about the heel end of the last and initiate the molding of the counter to the shape of the last, the last is moved to a heel seat lasting position and forced upwardly against a hold-down, upward tensioning forces are applied at the toe end of the upper to assemble the upper on the last, a clamping force is applied at the heel of the last to maintain the upper stationary on the last and to complete the molding of the counter to the shape of the last, and the margins of the upper and counter are wiped down onto an insole located on the bottom of the last to thereby unite the lasted margin of the upper to the insole by adhesively bonding the counter to the upper and insole. After the counter has cooled sufficiently to cause the counter to revert to its normal, rigid condition, the upper is released.

In setting up the machine for a particular size of last, the adjustments described in the aforesaid application Ser. No. 107,156 are performed. This includes adjusting the position of the hold-down foot 206 so that it is positioned below the wipers 166 an amount that is dependent on the thickness of the upper margin and the counter. The rack 58 is normally in the FIG. 1 position so that the post 20 and the upper tensioning unit 42 are swung away from the heel seat lasting unit 66 and the hold-down unit 196 and the toggle linkage of the floating actuator 78 is normally in the FIG. 3 position so that the heel seat lasting unit 66 is in a rearward position in the frame 10.

Figure 13:
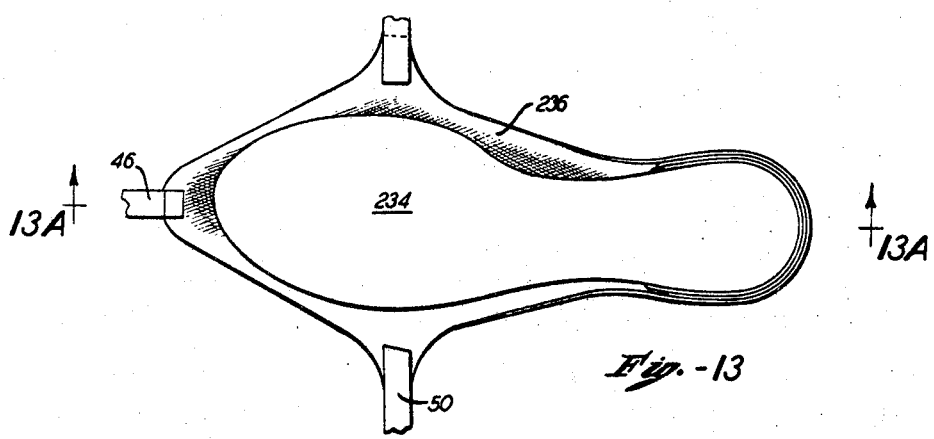
FIGURES 13, 13A, 14, 15 and 16 are representations of the shoe and last in early stages of the machine cycle prior to the wiping operation with FIG. 13A being taken on the line 13A—13A of FIGURE 13.
Figure 13A:
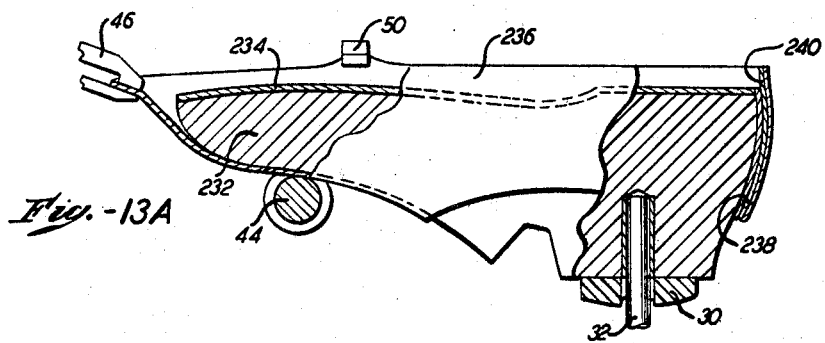

A last 232 is provided having an insole 234 mounted on its bottom and an upper 236 draped thereon. A liner 238 is secured to the heel of the upper to engage the heel of the last, and a counter 240 having the aforesaid characteristics is located in the pocket formed between the upper and the liner. The last is placed bottom-up on the last supporting plate 30 with the pin 32 entering the conventional last pin hole in the last. The toe portion of the upper and last is supported on the roller 44, the toe end of the upper margin is inserted between the jaws of the front pincers 46, and the forepart portions of the upper margin are inserted between the jaws of the side pincers 50. At this time the upper end of the liner 238 is substantially level with the insole 234 and the upper margins of the counter 240 and upper 236 at the heel of the last extending above the insole 234 as indicated in FIG. 13A.

The control system of the machine is now actuated to cause the machine to go through its cycle. As a result, the motors 48 and 52 are actuated to respectively cause the front pincers 46 and the side pincers 50 to grip the margin of the upper as indicated in FIGURES 13 and 13A. After this the motors 36 are actuated to cause the upper tensioning mechanism 42 including the pincers 46 and 50 to move forwardly on the bars 34 to thereby horizontally stretch the upper in the direction of the toe of the last and cause a firm wrapping of the upper about the heel of the last and a tension force on the counter to start to mold it to the shape of the last. Now the motor 62 is actuated to lower the piston rod 64 and the rack frame 61 to thereby swing the post 20 about the pivot 22 to a position where the shoe is adjacent to but not in engagement with the heel seat lasting unit 66 and the hold-down unit 196. In this position the post 20 is in alignment with the hold-down foot 206 but the insole 234 is below the hold-down foot. In addition, in this position the shoe upper and last are not in engagement with the heel clamping pad 126.

Figure 14:
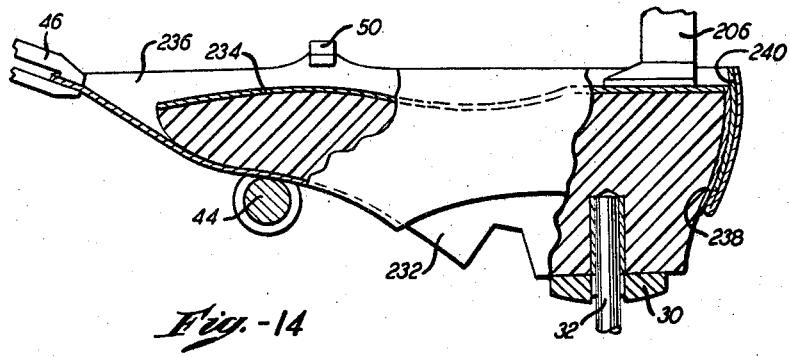

Now the motor 14 is actuated to raise the post 20 and thus raise the last and shoe until the insole 234 bears against the hold-down foot 206. In this position the shoe and last are clamped between the hold-down foot and the last supporting plate 30, as indicated in FIG. 14, with the upwardly facing surface of the insole 234 slightly above the top surface of the clamping pad 126 and below the undersurfaces 191 of the wipers 166. After this the T-bar 54 is raised by the aforesaid motor in the upper tensioning unit 42 to raise the pincers 46 and 50 to thereby apply an upward tension to the margin of the upper 236 at its toe and forepart portions to thereby stretch the upper tightly on the last and assemble it in proper position for the subsequent heel seat lasting operation. Since the last and shoe are clamped at this time between the foot 206 and plate 32, upward movement of the pincers will not shift the last.

Figure 15:
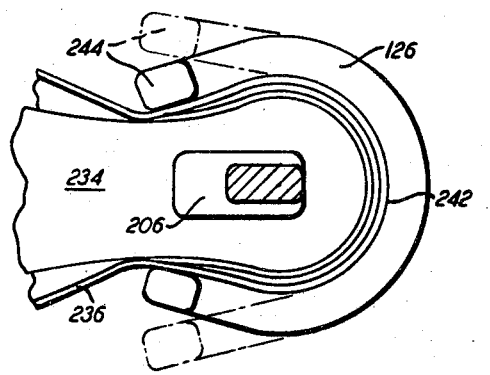

After this, the motor 82 on the floating actuator 78 is actuated to thereby raise the piston rod 84 and straighten the toggle links 86 and 88. The straightening of the toggle links moves the block 72 and the heel seat lasting unit 66 carried thereby from its normal out-of-the-way position to a position adjacent the shoe and last. Now the motors 98 are actuated to cause the piston rods 102 to move the levers 104 and the clamping pad 126 carried thereby toward the heel of the last with the slide 114 sliding in the gibs 122. During this movement the springs 116 and 118 maintain the lever legs 108 in abutting relation and the lever legs 110 in open position until the bight 242 of the pad 126 engages the shoe as indicated in dotted lines in FIG. 15. At this time the bight of the pad and the slide 114 can no longer move forwardly so that continued forward movement of the piston rods 102 causes the levers 104 to swing toward each other about the pivots 106 to cause the legs 244 of the pad to move toward each other and engage the shoe as indicated in solid lines in FIG. 15.

Figure 16:
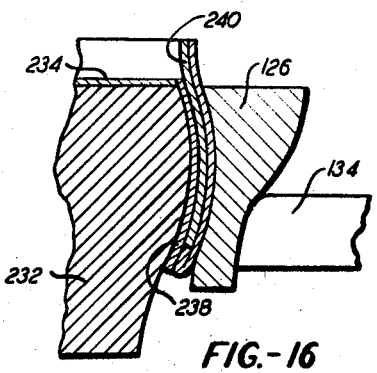

Now the motors 132 are actuated to force the presser members 134 against the pad 126 and thereby press the pad against the shoe and last. As seen in FIG. 16, the presser members engage the pad towards the bottom of the pad opposite the portions of the last that curve inwardly to form a last portion having a relatively narrow width. The pressure members ensure that all of the pad 126 bears against the last 232 to thereby hold the upper firmly in place during the subsequent lasting operation and to augment the molding of the counter 240 to the shape of the last.

Figure 17:
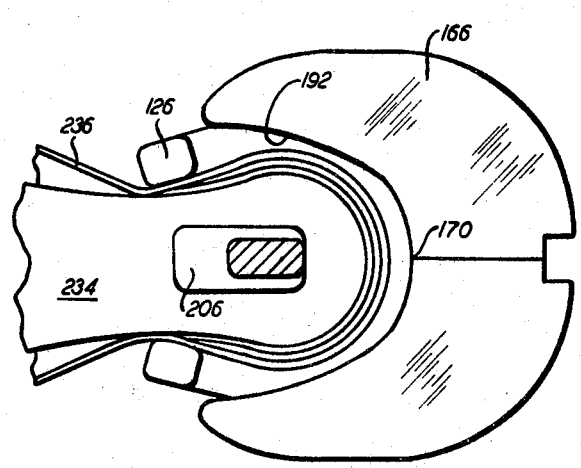
FIGURE 17 is a representation in plan of the machine parts and the shoe and last before the wipers commence their working stroke.
Figure 18:
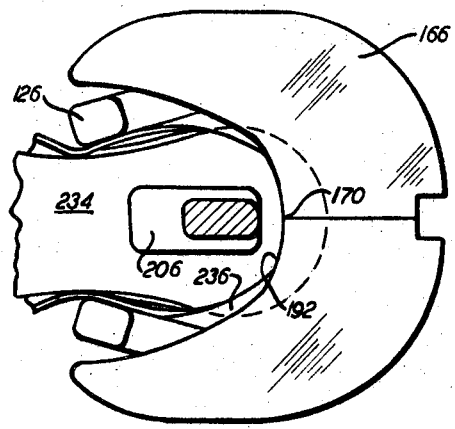
FIGURE 18 is a representation in plan of the machine parts and the shoe and last after the wipers have completed their translatory movement.

After the pad 126 has clamped the upper against the last, the motor 140 is actuated to move its piston rod 144 forwardly. This causes the plate 136 to move forwardly in the gibs 138 and between the rollers 188 until the bolt 148, acting as an abutment, strikes the cover plate 71. At this time there is no air pressure supplied to the motor 174, so that the piston 178 moves forwardly of the motor 174 and the wipers 166 do not have any movement relative to the plate 136 during the forward movement of the plate. As a result the wipers are translated forwardly from the FIG. 17 to the FIG. 18 position without moving inwardly about the vertex 170 so that only the bight of the wiper side surfaces 192 at and adjacent the vertex 170 cross over the last to wipe the upper and counter margins at and adjacent the heel of the last down upon the insole, and the forwardmost portions of the surfaces 192 and the prongs 194 do not engage the upper.

Figure 19A:
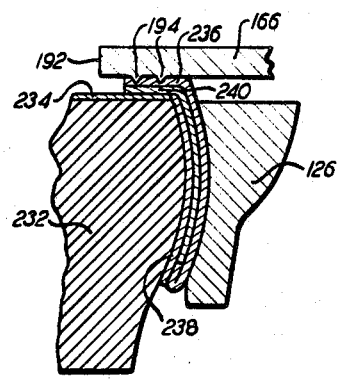
FIGURE 19A is a view taken on the line 19A—19A of FIGURE 19.
Figure 19:
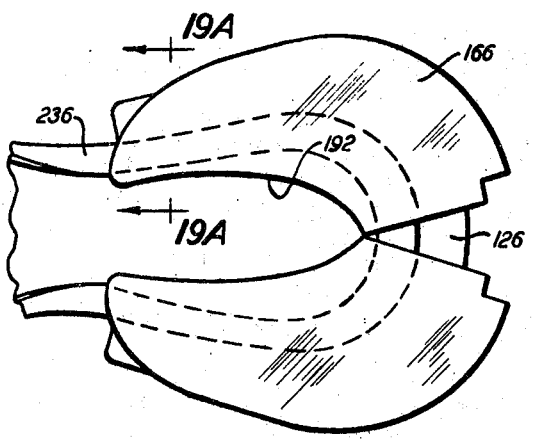
FIGURE 19 is a representation in plan of the machine parts and shoe and last after the wipers have completed their inward movement.

When the plate 136 has terminated its forward movement the motor 174 is actuated to move the piston rod 178 forwardly and thereby cause the rod 158 to move forwardly with the rollers 156 moving in the slot 154 of the plate 136 until the bolt 182, also acting as an abutment, strikes the frame cover 71. This causes the links 162 to swing the wipers 166 inwardly about the vertex 170 from the FIG. 18 to the FIG. 19 position so that the forwardmost portions of the wiper side surfaces 192 and the prongs 194 cross over the last to wipe the upper and counter margins upon the insole between about the breastlines of the upper and the portion of the upper engaged by the wipers during the translation of the wipers. Depending on the type of shoe being operated on and the particular lasting technique employed, the motor 218 is actuated at a desired time between the commencement of the inward swinging movement of the wipers and after the completion of this movement. Actuation of the motor 218 moves the cam 222 forwardly to present the low cam portion 230 between the rollers 210, 212 and thus causes the raising of the hold-down foot 206 so that the motor 14 applies upward pressure by the last directly against the wipers. During the inward swinging movement of the wipers the prongs 194 impale themselves on the upper margin at adjacent the breastline to drag and stretch the upper margins inwardly towards the center line of the last and to also stretch the heightwise reaches of the upper margin located between the last 232 and clamping pad 126 (see FIG. 19A). The clamping pressure of the pad against the last is sufficiently low so that this stretching can take place. When the upper has been stretched to its utmost by the prongs, the prongs slide along the surface of the upper margin during their inward movement. Since the prongs do not engage the upper during the translation of the wipers but only when they swing in an arc about the vertex 170, they, for all practical purposes, move in a line that is substantially normal to the longitudinal center line of the last and thus drag the breast line portions of the upper and counter laterally of the center line of the last with substantially no toeward or heelward movement which provides for a desirably tight stretching of the upper about the last and a preclusion of the fading of the upper away from the wipers at the breast lines. This desired result is also aided by the fact that the upper margin is clamped between the wipers and insole due to the raising of the hold-down foot 206 when it is raised prior to the completion of the inward movement of the wipers and also by the adhesive on the counter being in a tacky condition so that the counter margin can slide along the insole.

After the wipers have concluded their wiping stroke, they remain in position above the insole with the motor 14 providing bedding pressure of the now wiped upper and counter margins until the counter has cooled sufficiently to revert to its rigid condition and the adhesive on the counter has cooled sufficiently to effect a permanent bond between the upper margin and insole and between the upper and the liner 238.

The control of the machine is then actuated to return the machine parts to their original positions and the lasted shoe is released from the machine.

While in the illustrative embodiment of the invention, the wipers are disclosed as having a vertex at their bight where the divergent side surfaces 192 intersect, the invention is not to be construed as being limited to such a condition. The invention would equally be practiced where the vertex is in a different location so long as the vertex is disposed proximate to the bight of the wipers and the wipers are so constructed that their bight may cross the last prior to the forward portions from which the prongs depend. For example, the invention could be practiced with wipers having a bight and vertex disclosed in Patent No. 3,032,790 or in application Ser. No. 232,138, filed Oct. 22, 1962.

It should be understood that although the invention has been disclosed as being used to last the heel end of a shoe it could as well be practiced to last the toe end of a shoe with the prongs on the wipers engaging the forepart portions of the upper margin. To adhesively bond the upper at the toe to the insole, a box toe could be provided that is constructed like the aforementioned counter.

In the appended claims, terms such as "upwardly" and "forwardly" are used merely to define the relative positions and paths of movements of the parts and should be construed accordingly.

We claim:

1. A method of lasting an end of a shoe comprising: supporting bottom-up a last having a shoe insole located on its bottom and a shoe upper mounted thereon with the margin of an end of the upper extending upwardly of the insole; providing a pair of wipers that have side surfaces diverging forwardly from a bight, that are mounted for inward and outward swinging movement about a vertex that is proximate to the bight, and that each have at least one prong depending from an otherwise smooth undersurface in a region relatively remote and forwardly of the vertex; supporting the wipers adjacent the end of the last corresponding to said end of the upper so that said side surfaces are exterior of the said end of the upper and last; causing relative forward translation of the wipers with respect to the last so that the bight of the wipers crosses the last to wipe the upper margin at the extremity of said end of the last upon the insole with the prongs remaining exteriorly of the last; and swinging the wiper side surfaces inwardly about the vertex to cause the remainder of the wiper side surfaces to cross the last and wipe the upper margin portions engaged thereby against the insole and to cause the prongs to drag the said margin portions inwardly during this movement and stretch them tightly about the last.

2. The method according to claim 1 further comprising: applying a relative upward force of the last with respect to the wipers during the swinging of the wipers about the vertex to clamp the upper margin between the insole bottom and the wiper undersurfaces.

3. The method according to claim 1 further comprising: clamping the upper against the side of the last at said end of the last prior to the relative translation of the wipers with respect to the last.

4. The method according to claim 1 further comprising: providing an adherent material between the upper margin and the insole that is in a tacky condition during the inward swinging movement of the wipers.

5. The method according to claim 4 wherein a stiffener is located inwardly of the upper at said end of the last and wherein said adherent material comprises a coating of adhesive on the inner surface of said stiffener.

6. A shoe end lasting machine comprising: a shoe support for supporting bottom-up a last having a shoe insole located on its bottom and a shoe upper mounted thereon with the margin of an end of the upper extending upwardly of the insole; a pair of wipers having side surfaces that diverge forwardly from a bight; means constructing the wipers to enable the side surfaces to swing inwardly and outwardly about a vertex that is proximate to the bight; at least one prong in each wiper depending from an otherwise smooth undersurface in a region relatively remote from and forwardly of the vertex; means supporting the wipers adjacent the end of the last corresponding to said end of the upper so that said side surfaces are exterior of said end of the upper and last; means for imparting relative forward translation of the wipers with respect to the last to cause the bight of the wipers to cross the last to wipe the upper margin at the extremity of said end of the last upon the insole with the prongs remaining exteriorly of the last; and means to swing the wipers inwardly about the vertex to cause said regions of the wipers to cross the last and wipe the upper margin positions engaged thereby against the insole and to cause the prongs to drag the said margin portions inwardly during this movement and stretch them tightly about the last.

7. The machine according to claim 6 further comprising: means for applying relative upward force of the shoe support with respect to the wipers during the operation of the wiper swinging means to thereby clamp the upper margin between the insole bottom and the wiper undersurfaces.

8. The apparatus according to claim 6 further comprising: a clamping pad located below the wipers; and means for imparting relative closing movement of the pad with respect to the last to thereby clamp the upper against the side of the last at said end of the last prior to the actuation of the translation imparting means.

9. A shoe end lasting machine comprising: a pair of wipers having side surfaces that diverge forwardly from a bight; means mounting the wipers for forward translatory movement in a predetermined plane and for swinging movement about a vertex proximate to said bight on an axis that is transverse to said predetermined plane; at least one prong in each wiper depending from an otherwise smooth undersurface in a region relatively remote from and forwardly of the vertex; a shoe support adjacent the wipers for supporting bottom-up a last having a shoe insole located on its bottom and a shoe upper mounted thereon with the margin of an end of the upper extending upwardly of the insole and with the said wiper side surfaces positioned exteriorly of the end of the last corresponding to said end of the upper; a hold-down foot located above the shoe support with its bottom slightly below said wiper undersurfaces; powered means operatively connected to the shoe support to apply an upward force thereto with the insole bearing against the hold-down foot; means for imparting forward translation of the wipers to cause the bight of the wipers to cross the last to wipe the upper margin at the extremity of said end of the last upon the insole with the prongs remaining exteriorly of the last; means to swing the wipers inwardly about the vertex to cause said regions of the wipers to cross the last and wipe the upper margin portions engaged thereby against the insole and to cause the prongs to drag the said margin portion inwardly during this movement and stretch them tightly about the last; and means effective during the said swinging movement of the wipers to cause the hold-down foot to be raised and thereby cause the powered means to press the insole and wiped upper margin against the bottoms of the wipers.

10. A lasting mechanism comprising: a frame; a wiper supporting plate movably mounted in the frame for exclusive forward translatory movement in a predetermined plane; a pair of wipers symmetricaly mounted on the plate for inward movement with respect to the plate in said plane; a drive rod located rearwardly of the wipers and movably mounted in the plate for forward movement with respect to the plate; link means extending forwardly from the drive rod to the wipers and interconnecting the drive rod and the wipers; a first drive means connected to the plate to effect said forward translation thereof; and a second drive means connected to the drive rod to impart forward movement of the drive rod with respect to the plate and thereby effect said inward movement of the wipers.

11. A lasting mechanism comprising: a frame; a wiper supporting plate slidably mounted in the frame for forward translatory movement; a pair of wipers symmetrically mounted on the plate for inward movement with respect to the plate; a drive rod located rearwardly of the wipers and movably mounted in the plate for forward movement with respect to the plate; link means extending forwardly from the drive rod to the wipers and interconnecting the drive rod and the wipers; a first motor connected to the plate to effect forward translatory movement thereof; and a second motor connected to the drive rod to impart forward movement of the drive rod with respect to the plate and thereby effect inward movement of the wipers.

12. A lasting mechanism comprising: a frame; a wiper supporting plate slidably mounted in the frame for forward translatory movement; a pair of wiper cams symmetrically mounted on the plate for inward swinging movement; a wiper mounted in each cam and extending forwardly thereof; a drive rod mounted on the plate, rearwardly of the wiper cams, for forward movement with respect to the plate; links extending from the drive rod to the wiper cams operative to swing the wiper cams inwardly in response to said forward movement of the drive rod; a first motor mounted on the frame and operatively connected to the plate to effect forward translation thereof; and a second motor mounted on the frame and operatively connected to the drive rod to effect forward movement thereof with respect to the plate.

13. A lasting mechanism comprising: a frame; a main plate in the frame; a wiper supporting plate slidably mounted in the frame above the main plate for forward translatory movement; a pair of wiper cams symmetrically mounted on the wiper supporting plate for inward swinging movement; a wiper mounted in each cam and extending forwardly thereof; a drive rod mounted on the wiper supporting plate, rearwardly of the wiper cams, for forward movement with respect to the wiper supporting plate; links extending from the drive rod to the wiper cams operative to swing the wiper cams inwardly in response to said forward movement of the drive rod; a first fluid operated motor mounted on the main plate having a piston rod that is connected to the wiper supporting plate, whereby actuation of said first motor imparts forward translatory movement to the wiper supporting plate; and a second fluid operated motor mounted on the main plate having a piston rod that is connected to the drive rod, whereby actuation of said second motor imparts forward movement of the drive rod with respect to the wiper supporting plate.

14. The lasting mechanism according to claim 13 further comprising: a first abutment mounted on the wiper supporting plate that is in alignment with the frame for limiting the extent of forward movement of the wiper supporting plate upon actuation of the first motor; and a second abutment mounted on the drive rod that is in alignment with the frame for limiting the extent of forward movement of the drive rod upon actuation of the second motor.

References Cited

UNITED STATES PATENTS

| Re. 14,261 | 2/1917 | Kelly | 12—145 |
| Re. 13,507 | 1/1913 | Plant | 12—8.4 |
| 1,023,555 | 4/1912 | Drey | 12—145 |
| 1,082,620 | 12/1913 | Brock | 12—8.4 |
| 391,001 | 10/1888 | Wood | 12—8.4 X |
| 1,393,396 | 10/1921 | Pym | 12—12.4 |
| 2,394,205 | 2/1946 | Robinson | 12—10.5 |
| 2,979,743 | 4/1961 | Gunschel | 12—12.5 X |

PATRICK D. LAWSON, *Primary Examiner.*